Aug. 25, 1931.          C. B. FOLEY          1,820,533
FILTER
Filed July 18, 1929
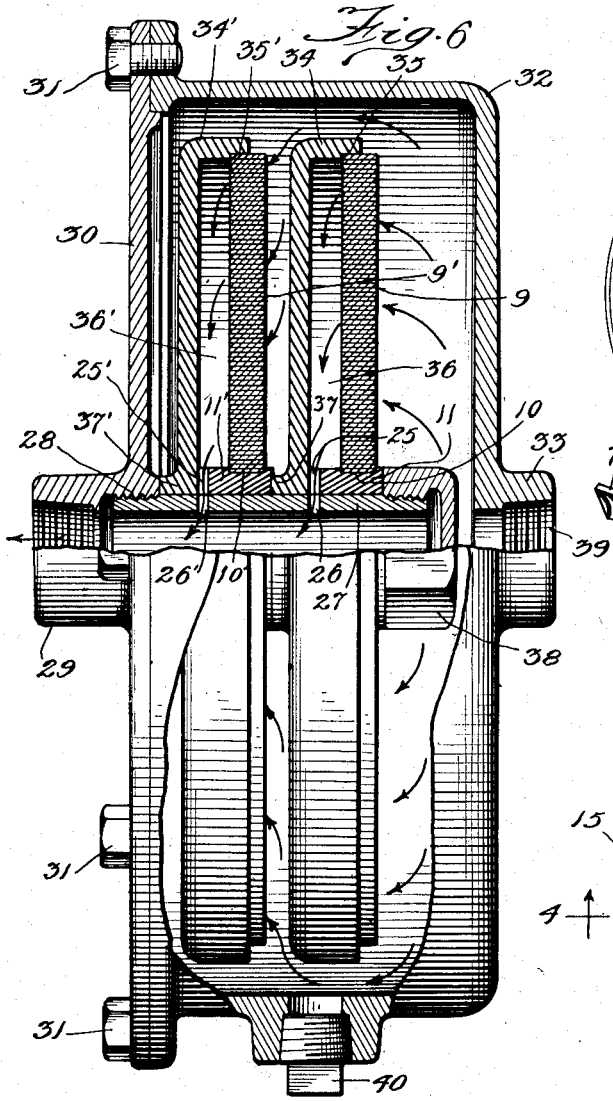
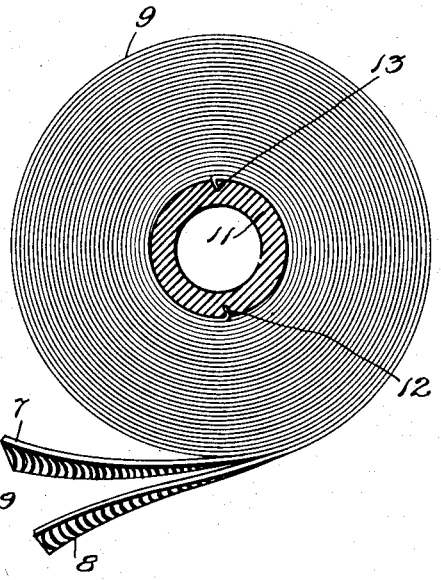
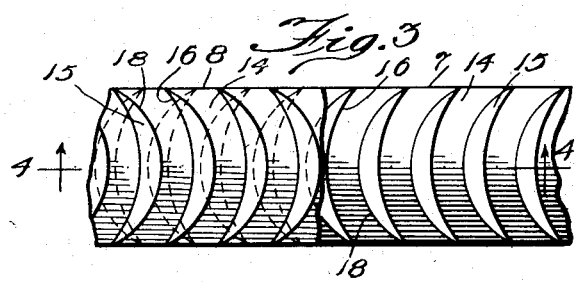
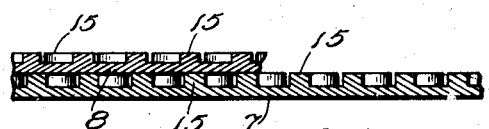
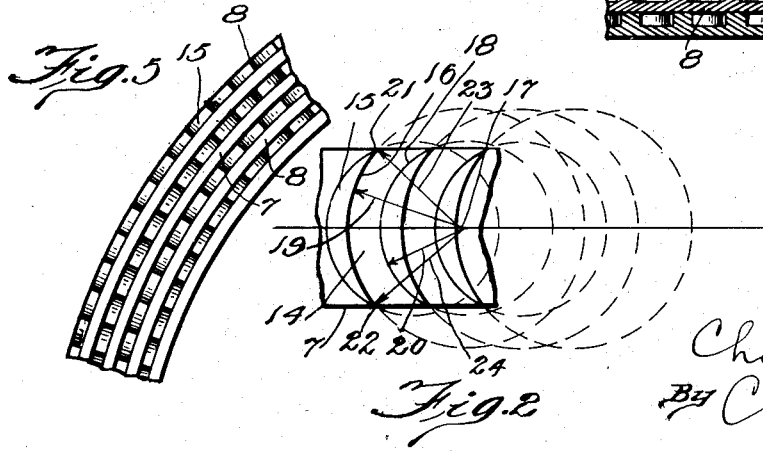
Inventor:
Charles B. Foley,
By Chas. M. Nissen,
Atty.

Patented Aug. 25, 1931

1,820,533

UNITED STATES PATENT OFFICE

CHARLES B. FOLEY, OF FORT WAYNE, INDIANA, ASSIGNOR TO S. F. BOWSER & COMPANY, INC., OF FORT WAYNE, INDIANA

FILTER

Original application filed August 2, 1928, Serial No. 296,908. Divided and this application filed July 18, 1929. Serial No. 379,087.

My invention relates to improvements in filters and one of its objects is the provision of an improved porous laminated filter particularly adapted to the filtering of oil, although it may have a general application.

A further object of the invention is the provision of a porous metal filter composed of thin laminations arranged in pairs each with spaced-apart arcuate grooves or passageways and mounted in criss-cross relation to increase the capacity of the filter by preventing the grooves or passageways from becoming restricted by the adjacent spaced-apart cross-bars.

Another object of the invention is the provision of a porous metal filter composed of thin laminations each having thereon crescent-shaped spaced-apart cross-bars.

A further object of the invention is the provision of a porous disc filter formed by winding in superimposed relation one or more pairs of thin metal ribbons or tapes having spaced-apart transverse crescent-shaped cross-bars on each tape arranged in reversed relation with respect to the cross-bars on the next adjacent tapes and in criss-crossed relation therewith.

Other objects of the invention will appear hereinafter, the novel features and combinations being set forth in the appended claims.

The present application is a division of my co-pending application Serial No. 296,908, filed August 2, 1928, for an improvement in filters.

In the accompanying drawings—

Fig. 1 represents a filter element embodying my invention;

Fig. 2 is an enlarged fragmentary section of one of the tapes or ribbons shown in Fig. 1;

Fig. 3 shows sections of tapes or ribbons illustrating the criss-crossed relation of the spaced-apart crescent-shaped cross-bars on the pair of tapes when wound into the form of a porous disc as shown in Fig. 1;

Fig. 4 is a sectional view taken on the line 4—4 of Fig. 3 looking in the direction of the arrows;

Fig. 5 is an enlarged view of a portion of a disc filter to illustrate the arrangement of the spaced-apart cross-bars and the passageways afforded by the winding of the grooved metal tapes or ribbons into the form of a disc filter; and Fig. 6 illustrates mechanism for supporting the disc filter in multiple for filtering liquid forced through the container shown.

In Fig. 1 I have shown a filter element consisting of two thin metal ribbons or tapes 7 and 8 so constructed and wound as to form a flat porous disc 9 having a thickness equal to the width of the tape or ribbon. A pair of ribbons or tapes may be wound in a groove 10 of a hub 11. The tape 7 may have its inner end inserted in a slot 12 extending transversely of the groove 10.

In a similar manner the inner end of the tape 8 may be inserted in a similar slot 13 in the hub 11.

In Fig. 2 I have shown an enlarged portion of the tape 7 to illustrate that the depressions or grooves 14 in the tape are wider than the crescent-shaped ridges, barriers or cross-bars 15. It should be particularly noted that the spaced-apart walls of each groove are concentric. Fig. 2 shows that the arcuate wall 16 has its center at 17 and the arcuate wall 18 of the groove 14 also has its center at 17. The difference between the radius indicated by the arrow 19 and the radius indicated by the arrow 20 is the width of the groove 14. The arcuate trough or groove between each crescent-shaped cross-bar and the next adjacent cross-bar is therefore uniform in cross-sectional area when the cross-section is taken radially from the center of the arcuate walls of the groove. While I have shown crescent-shaped cross-bars 15 with their opposite arcuate walls intersecting at the edges of the tape as shown at 21 and 22, it should be understood that the end portions of the cross-bars may have a width approximately equal to the width at the place of cross-section of a radius extending from the center 17 to the point 21 so that the width of each groove at the edges of the tape will be approximately equal to the width of the groove at the center of the tape.

By referring to Fig. 3 it will be seen that the cross-bars 15 on the tape 7 are arranged in criss-cross relation to the cross-bars 15 on the tape 8. By having the cross-bars crescent-shaped as shown in Figs. 2 and 3 with each groove 14 greater in width than the width of the cross-bars 15, the combined passageways extending from one flat face of the disc filter to the other are made as large as possible while maintaining the desired cross-sectional area of each passageway. Very thin metal tape is preferable and is for that reason quite flexible.

When a single tape provided with spaced-apart transverse grooves and cross-bars is wound tightly and compactly into the form of a disc the tendency is for the pressure from the cross-bars to bend the smooth body at the backs of the grooves or transverse passageways, thereby diminishing the cross-sectional area of the passageways. This is particularly true when it is attempted to use grooves which are wider than the cross-bars. In other words, if cross-bars each having a width greater than the width of the groove are used, the combined cross-sectional area of the passageways is diminished and if the grooves are widened so as to be each greater than the width of the cross-bars the tendency is for the backs of the grooves to bend and partially close the passageways.

By means of my improvement the grooves 14 may be wider than the cross-bars as shown in Fig. 2. By providing a pair of tapes with transverse crescent-shaped cross-bars in relative criss-cross arrangement as shown in Fig. 3, the cross-bars of one tape will bear against the smooth surface of the other tape without any tendency to depress the metal between the cross-bars. This can readily be seen by referring to Fig. 3 where I have shown superposed sections of the tapes 7 and 8. The faces of the cross-bars 15 on the tape 7 each bears against the backs of end portions of one cross-bar 15 on the tape 8 and also against the middle portion of the back of the next adjacent cross-bar 15. This is shown clearly at the left-hand portion of Fig. 3.

Fig. 4 is a section taken on the line 4—4 of Fig. 3 looking in the direction of the arrows and also shows that the middle portions of the cross-bars 15 of the tape 7 abut against the back of the tape 8 where the cross-bars are located on the latter.

In the drawings the smooth sides of the tapes are shown wound toward the center of the disc. When the smooth bottom of the tape 8 is thus wound over the outer grooved surface of the tape 7, the cross-bars 15 of the tape 7 occupy a criss-crossed relation with respect to the cross-bars 15 of the tape 7.

The tapes are preferably wound in pairs so that the smooth sides and grooved sides of the tape alternate. Pairs of tape may be wound with their faces toward or away from the center of the disc, the winding shown in Figs. 1 and 5 having the cross-bar faces of the tapes away from the center of the disc.

If desired, a plurality of pairs of tapes may be wound simultaneously into the same disc, particularly when the tapes are very thin and require distribution of the pulls exerted thereon during the winding operation.

The lengths of the radii 19 and 20 may be varied but it is preferred to provide direct passageways between the flat faces of the disc of predetermined length and cross-sectional area and to maintain these passageways as predetermined; I have provided three points of cross-over in that the crescent-shaped cross-bars 15 abut against the backs of the next adjacent cross-bars at their middle portions and at their end portions as shown in Figs. 3 and 4. Therefore there will be no tendency of the cross-bars 15 to press into the smooth-surfaced backs of the grooves 14 of the next adjacent tape.

By thus preventing the backs of the grooves from becoming indented by adjacent cross-bars the grooves 14 may be made comparatively wide and the cross-bars comparatively narrow, thereby increasing the porosity of the disc filter by preserving the full cross-sectional area of each tubular passageway between the flat faces of the disc, which tubular passageways extend from edge to edge of the laminations composed of the metal tapes 7 and 8. As above explained, by having the opposite walls of the cross-bars intersect at the points 21 and 22 at the edges of the tapes the cross-sectional area of the passageways is enlarged at the points of ingress and egress while the arcuate passage-way between the radii 23 and 24 shown in Fig. 2 is maintained uniform. However, by widening the ends of the cross-bars above and below the radii 23 and 24 as shown in Fig. 2, the cross-sectional area at the points of ingress and egress may be made equal to the cross-sectional area at the central portion of the groove 14.

Fig. 5 is an enlarged view of a portion of a disc filter. This view shows the metal tapes a great deal thicker than would be used in practice in order to show the relationship of the tapes 7 and 8 and the cross-bars thereon. It should be understood, however, that the grooves or passageways 14 are minute and approach capillary proportions. The metal tape is in reality very thin, preferably thinner than Bristol board drawing paper, and the depressions in the tape are small, shallow depressions made by compressing with a die-wheel one of the smooth metal surfaces of each metal tape.

The cross-sectional area and the shape of the passageways may be varied in accordance with the nature, viscosity, etc., of the liquid to be filtered and with the nature of the impurities to be removed from the liquid. The width of the tape may also be varied, but it is preferable to use a comparatively narrow tape of a width and cross-section consistent with the strength of the disc filter and its diameter. A narrow tape shortens the passageways and reduces the friction of the liquid passing through the filter and therefore reduces the pressure necessary to operate the filter.

The tapes may be of copper or other material of sufficient strength to permit tight winding of both tapes without undue distortion, compression or stretching of the metal itself. Since the grooves or channels 14 are preferably formed by indentations or depressions in one surface of each tape, the cross-bars 15 are integral with the body of the tape in the form shown in the drawings.

While the thickness of the tape and the depth of the grooves may be varied according to conditions and the material to be filtered, it has been found satisfactory to filter certain kinds of oils by using copper tapes each one-quarter of an inch in width and four-thousandths of an inch in thickness, with the depressions or grooves from three ten-thousandths to eight ten-thousandths of an inch in depth and each groove having a width approximately one-sixteenth of an inch, leaving the cross-bars as separators or dividing ribs approximately one thirty-second of an inch to one sixty-fourth of an inch in width. That is to say, the cross-sectional dimensions of each transverse groove or channel 14 at the central portion thereof is one-sixteenth of an inch wide and from three ten-thousandths to eight ten-thousandths of an inch in depth and the cross-sectional dimensions of each cross-bar at the central portion thereof is one thirty-second of an inch to one sixty-fourth of an inch by from three ten-thousandths of an inch to eight ten-thousandths of an inch, in a double tape wound copper disc filter found to be practical for efficiently removing impurities from certain kinds of oils such as oils used for transformers in electrically insulating the same; the filter has also been found desirable and practical for filtering switch oils. It should be understood, however, that I do not wish to be limited to these particular dimensions and that they are set forth for illustrative purposes to show that the grooves, passageways or channels 14 are so small as to approach capillary proportions and to show the practicability and utility of the disc filter when the through-put is increased by enlarging the width of the grooves, although substantial pressure is necessary to operate the filter. Such pressure may vary and may be as high as one-hundred and fifty pounds per square inch, depending upon the condition of the filter, the length of time it has been operated and the amount of collected impurities on the inlet face of the disc filter.

It should also be understood that the depressions in the tape may be made in various ways, but it has been found to be satisfactory to prepare a roll or wheel with the desired pattern cut in relief on its cylindrical peripheral surface with the raised bars representing the channels, grooves or passageways 14 of the tape, and then imprinting such pattern on the tape to obtain the spaced-apart raised crescent-shaped cross-bars 15. This is very accurate and rapid and results in a better tape than can be produced by attaching the cross-bars as separators to the tape. The degree of filtration may be regulated by varying the sizes of the passageways which are rolled into the tape as above described, but the predetermined cross-sectional area of the grooves 14 is efficiently maintained by reason of the criss-cross relation of the crescent-shaped cross-bars as illustrated in Fig. 3.

It will also be evident that while I prefer to use tapes with the cross-bars 15 integral therewith, such cross-bars may be attached thereto while still maintaining freedom from passageway obstruction and while maintaining requisite strength for winding. When two or more tapes are wound simultaneously, thinner tape may be used, the winding pull being distributed on the plurality of tapes while being wound, and the increased pull thus permitted, results in the winding of a much more compact disc filter than is possible when a single tape is wound into a disc.

In Fig. 6 I have shown two disc filter units mounted in multiple and each with their flat faces in vertical planes. The hubs 11 and 11' are provided with grooves 10, 10' in which the filter elements 9, 9' are mounted. The hubs 11, 11' are provided with ports 25, 25' which are adapted to register respectively with the ports 26, 26' in the pipe 27 when the filter units are assembled as shown in Fig. 6.

The pipe 27 is screw-threaded at 28 to the outlet port 29 which is located at the center of a flat plate 30. The latter is detachably connected by means of the bolts 31 to the casing 32 which has an inlet port 33 at the center thereof to receive the material to be filtered.

The filter disc elements 9, 9' are mounted in flat cups 34, 34' by being soldered thereto at their peripheries at 35, 35' to annular recesses in the cups 34, 34'. Chambers 36, 36' are thus formed for receiving the filtered liquid which then flows through the ports 25, 25' and 26, 26' into the pipe 27 and out through the outlet port 29. The flow of the liquid to and through the filter elements into the chambers 36, 36' and to the outlet port 29 is indicated by the arrows in Fig. 6.

The center of each flat cup 34, 34' is provided with a hub 37, 37' which fits over the pipe 27, and by means of the hubs 37, 37' and 11, 11' the filter units may be spaced apart as shown in Fig. 6. By means of the screw cap 38 on the right-hand end of the pipe 27 the filter units may be securely held in place and rigidly connected to the enclosure formed by the plate 30 and the casing 32. The connection at 33 is shown screw-threaded at 39 in Fig. 6 for the connection of a pipe leading under pressure into the casing 32. Inasmuch as the cap 38 is closed the liquid cannot reach the outlet port 29 except by passing through the porous disc filter units. The porosity of the laminated metal disc filter elements being such that each consists of a multiplicity of comparatively minute passageways, the impurities in the liquid will collect on the inlet faces of the discs and form cakes thereon, but such deposited caked impurities will themselves act to filter the impurities of additional liquid flowing into the casing 32.

Inasmuch as the filter units are arranged in vertical positions such impurities as are not caked on the right-hand faces of the filter elements may fall by gravity to the bottom of the casing 32 and be drained out from time to time by removing the screw-threaded plug 40. Also at intervals the casing 32 may be detached from the plate 30 by removing the bolts 31 thereby gaining access to the right-hand faces of the filter elements to scrape off the impurities caked thereon, thus restoring the filter units to their original efficiency.

It should be understood that the multiple tape is wound as tightly as is consistent with its strength. Multiple tape may be wound more tightly than a single tape of the same dimensions. When completed, the filter is very compactly wound, so super-tight in fact as to have the appearance of a solid disc or plaque of metal and when mounted on the hub 11 within the grasp of the periphery of the cup 34 by soldering or otherwise the metal in the disc filter element gives the latter ample strength to withstand considerable pressure placed on the inlet face of the disc by the pressure exerted on the liquid pumped into the casing 32 through the inlet port 39.

Obviously those skilled in the art may make various changes in the details and arrangement of parts without departing from the spirit and scope of the invention defined by the claims hereto appended and I wish therefore not to be restricted to the precise construction herein disclosed.

Having thus described and shown an embodiment of my invention, what I desire to have secured by Letters Patent of the United States is:

1. A filter element comprising laminations with spaced-apart cross-bars arcuately criss-crossed relative to adjacent laminations.

2. A filter element comprising laminations with adjacent pairs having criss-crossed spaced-apart arcuate cross-bars.

3. A filter element comprising laminations with spaced-apart crescent-shaped cross-bars criss-crossed relative to adjacent laminations.

4. A filter element comprising laminations with adjacent pairs having criss-crossed spaced-apart crescent-shaped cross-bars.

5. A filter element comprising a pair of metal tapes wound to form a disc, each tape being provided with spaced-apart curved cross-bars extending transversely of the ribbon to form tubular passageways between the faces of the disc, the relation of the cross-bars on one ribbon of the pair being opposite to the relation of the cross-bars on the other tape of the pair.

6. A porous disc filter comprising a pair of narrow ribbons with spaced arcuate grooves and cross-bars thereon with the grooves wider than the cross-bars and with the ribbons wound without indenting the backs of the grooves.

7. A filter comprising laminations with spaced separators on each lamination, each separator extending diagonally from the central portion of the lamination in the same longitudinal direction to the edges of the laminations as any other separator, the diagonal relation of the separators on one lamination being opposite alternately to that on the next adjacent lamination.

8. A filter comprising laminations each having arcuate cross-bars in criss-crossed relation with the cross-bars of next adjacent laminations by overlapping end portions and middle portions thereof.

9. A filter comprising a tape with cross-bars which extend slantingly from the central portion of the tape toward the edges thereof in the same directions longitudinally of the tape to afford when laid down into laminations with the cross-bars of adjacent laminations reversely arranged, tubular passageways between the faces of the filter while the slanting portions of the cross-bars of adjacent laminations are in overlapping relation.

10. The method of assembling a disc laminated filter which consists in forming crescent-shaped spaced-apart separators on metal tape and winding the tape into a laminated disc with the separators in criss-crossed relation on adjacent laminations and overlapping at their middle and end portions.

11. The method of assembling laminated porous filters which consists in providing metal tape with spaced-apart arcuate grooves and laying the laminations with the grooves in criss-crossed relation as to adjacent laminations.

12. A porous metal disc comprising a pair of thin metal tapes wound tightly into a compact disc having flat faces, the outer surfaces of the ribbons being provided with spaced-apart grooves or channels separated by narrower spaced-apart arcuate cross-bars arranged on one tape in one direction and on the other tape in the opposite direction to criss-cross the super-imposed position of the cross-bars and prevent them from indenting the smooth backs of the tapes into the grooves when wound into the form of such disc.

13. A porous metal disc comprising a pair of narrow copper ribbons wound tightly into a compact metal disc having flat faces, the inner surfaces of the ribbons being smooth and the outer surfaces being provided with spaced-apart arcuate grooves separated by spaced-apart arcuate cross-bars arranged in one direction on one ribbon and in the opposite direction on the other ribbon to prevent the cross-bars from indenting the backs of the ribbons into the grooves, and thereby maintain the predetermined cross-sectional area of the tubular passageways between the flat faces of the disc.

In testimony whereof I have signed my name to this specification on this 12th day of July, A. D. 1929.

CHARLES B. FOLEY.